United States Patent
Kimura et al.

(10) Patent No.: US 8,295,676 B2
(45) Date of Patent: Oct. 23, 2012

(54) VIDEO REPRODUCING APPARATUS

(75) Inventors: Masaru Kimura, Iwaki (JP); Takeshi Ochiai, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 544 days.

(21) Appl. No.: 12/257,058

(22) Filed: Oct. 23, 2008

(65) Prior Publication Data

US 2009/0162026 A1 Jun. 25, 2009

(30) Foreign Application Priority Data

Dec. 21, 2007 (JP) ................................. 2007-329673

(51) Int. Cl.
*H04N 9/80* (2006.01)

(52) U.S. Cl. ........................................ 386/241; 386/248

(58) Field of Classification Search ........................ None
See application file for complete search history.

(56) References Cited

U.S. PATENT DOCUMENTS

| | | | |
|---|---|---|---|
| 6,393,201 B1 | 5/2002 | Sakuramoto et al. | |
| 6,493,506 B1 | 12/2002 | Schoner et al. | |
| 6,914,863 B2 | 7/2005 | Ono | |
| 2003/0235402 A1* | 12/2003 | Seo et al. | 386/95 |
| 2005/0273588 A1* | 12/2005 | Ong et al. | 713/2 |
| 2006/0177197 A1* | 8/2006 | Nakamura et al. | 386/83 |
| 2007/0067054 A1* | 3/2007 | Danish | 700/94 |
| 2007/0081798 A1 | 4/2007 | Peng et al. | |
| 2007/0189719 A1 | 8/2007 | Furumachi et al. | |
| 2007/0206923 A1 | 9/2007 | Murakoshi et al. | |
| 2007/0269189 A1 | 11/2007 | Russ | |
| 2007/0286565 A1* | 12/2007 | Watanabe | 386/37 |
| 2007/0297764 A1* | 12/2007 | Shibutani | 386/95 |
| 2008/0022227 A1* | 1/2008 | Mae et al. | 715/825 |
| 2008/0075420 A1* | 3/2008 | Yamagishi | 386/68 |
| 2008/0118232 A1 | 5/2008 | Kakumu et al. | |
| 2008/0152322 A1* | 6/2008 | Onoda | 386/126 |
| 2009/0003172 A1* | 1/2009 | Yahata et al. | 369/53.41 |

FOREIGN PATENT DOCUMENTS

| | | |
|---|---|---|
| EP | 1 814 328 A1 | 8/2007 |
| JP | 11-273224 | 10/1999 |
| JP | 2002-223411 | 8/2002 |
| JP | 2003-203464 | 7/2003 |
| JP | 2006-60450 | 3/2006 |
| JP | 2007-134010 | 5/2007 |

OTHER PUBLICATIONS

European Search Report issued in related EPO Patent Application No. 08 02 1310.
Japanese Office Action dated Jun. 5, 2012 for Japanese Patent Application No. 2007-329673 with translation.

* cited by examiner

*Primary Examiner* — William C Vaughn, Jr.
*Assistant Examiner* — Eileen Adams
(74) *Attorney, Agent, or Firm* — Brinks Hofer Gilson & Lione

(57) ABSTRACT

A video reproducing apparatus performs continued reproduction of a video title in association with continued reproduction of applications. When a Power-OFF or Reproduction-Stop of the video reproducing apparatus event occurs at a time point when the video title is reproduced to a midpoint of a chapter, continued reproduction information of an HD DVD disk is identified, such as a title and a chapter being reproduced, and is stored in a memory at that point in time. When the power is turned ON without replacing the HD DVD disk, the application displays a chapter menu of the title, and a script including a command for starting reproduction of the chapter is activated by the application according to an operation of a button of the chapter menu.

13 Claims, 4 Drawing Sheets

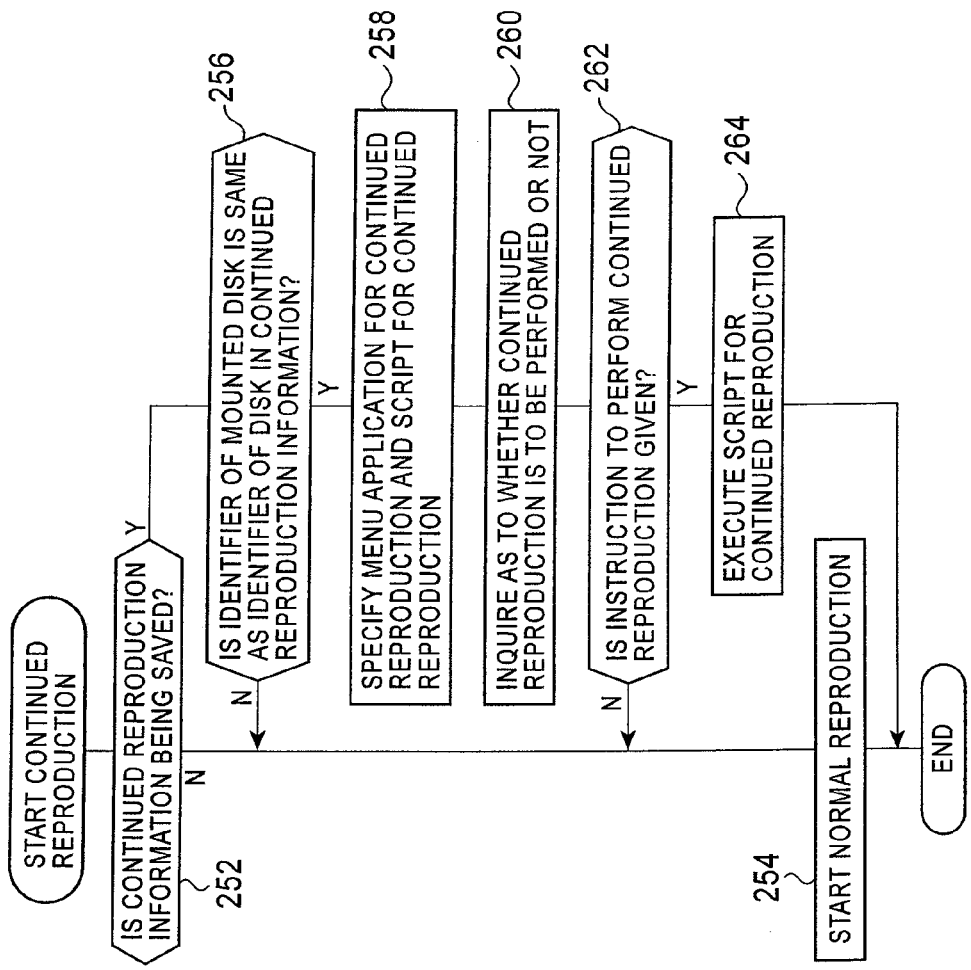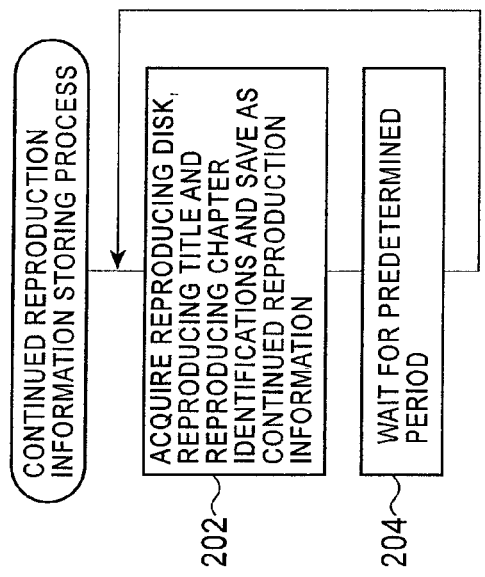

FIG. 3
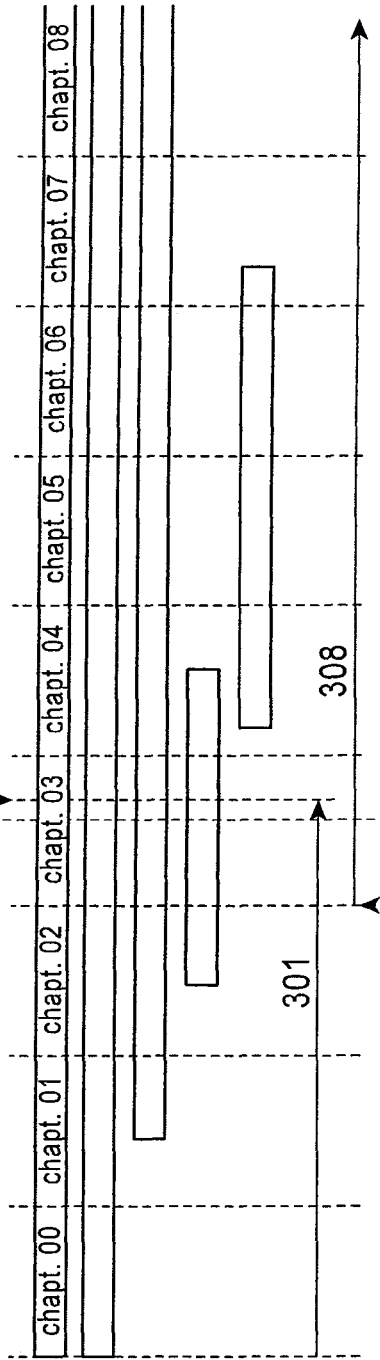
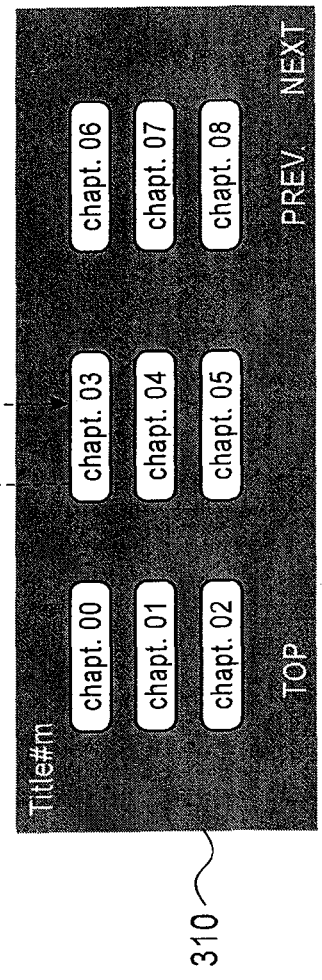

VIDEO REPRODUCING APPARATUS

PRIORITY CLAIM

This application claims the benefit of Japanese Patent Application No. 2007-329673, filed on Dec. 21, 2007, and which is incorporated by reference herein in its entirety.

BACKGROUND OF THE INVENTION

1. Field of the Invention

The present invention relates to a technology for performing continued reproduction in a video reproducing apparatus for reproducing a video disk in which a video title is recorded.

2. Description of the Related Art

Technology for reproducing a video disk in which a video title is recorded according to a DVD-Video standard is described in JP-A-2003-203464 and JP-A-2002-223411.

Various applications may be implemented together with the video title on the video disks in which a video title is stored according to HD DVD-Video Standard or BD-video Standard.

When continued reproduction of these video disks is performed, it is necessary to store the state of the applications being implemented, in addition to the point of reproduction of the video title at the time point when the power is turned OFF. This process is complicated, and the amount of information to be stored is very large.

SUMMARY OF THE INVENTION

Accordingly, it is an object of the invention to provide a video reproducing apparatus for reproducing video disks including an application to be implemented together with a video title defined therein, in which continued reproduction of the video title in association with the continued reproduction of the application is realized in a simple configuration.

The video reproducing apparatus is configured to reproduce a video disk in which a plurality of applications to be implemented at the time of reproduction are recorded together with a video title including a plurality of chapters. A continued reproduction information storing unit stores an identification of a chapter being reproduced when the power is turned OFF. A continued reproduction starting unit implements a process using the applications stored in the video disk, which includes starting reproduction of the chapter whose identification is stored in the continued reproduction information storing unit when the power is turned ON.

A video reproducing apparatus for reproducing a video disk in which a plurality of applications to be implemented at the time of reproduction are recorded together with a video title and a plurality of chapters, includes a continued reproduction information storing unit configured to store an identification of a chapter being reproduced, when the reproduction of the video disk is stopped; and a continued reproduction starting unit having applications stored therein, the applications configured to start the reproduction of the chapter whose identification is stored in the continued reproduction information storing unit when the power is turned ON.

In another embodiment, a video reproducing apparatus for reproducing a video disk in which a plurality of applications to be implemented at the time of reproduction are recorded together with a video title and a plurality of chapters, includes a continued reproduction information storing unit configured to store an identification of a chapter being reproduced when the reproduction of the video disk is stopped, and includes a continued reproduction starting unit having applications stored therein, where the applications are configured to start of the reproduction of the chapter whose identification is stored in the continued reproduction information storing unit when the reproduction of the video disk is started.

In a further embodiment, a video reproducing apparatus for reproducing a video disk in which a video title including a plurality of chapters is recorded, includes a continued reproduction information storing unit configured to store an identification of a chapter being reproduced when power is turned OFF, and further includes a continued reproduction information display unit configured to display identification of the chapters stored in the continued reproduction information storing unit when the power is turned ON.

A video reproducing apparatus for reproducing a video disk in which a video title including a plurality of chapters is recorded, may include a continued reproduction information storing unit configured to store an identification of a chapter being reproduced when the reproduction of the video disk is stopped, and a continued reproduction information display unit configured to display identification of the chapters stored in the continued reproduction information storing unit when the reproduction of the video disk is started.

In still another embodiment, the continued reproduction starting unit is configured to issue an inquiry to a user to determine if continued reproduction is wanted by the user when the power is turned ON or when the reproduction of the video disk is started and, if the continued reproduction is wanted by the user, the continued reproduction starting unit carries out a continued reproduction process to start the reproduction of the chapter whose identification is stored in the continued reproduction information storing unit.

In another embodiment, the continued reproduction starting unit executes an application stored in the video disk for displaying a chapter menu including starting the reproduction of the chapter which is selected and accepted on the chapter menu when the application accepts the selection of the chapter.

The video disk may be an HD DVD in which a video content is stored according to HD DVD-Video Standard. The video disk may also be a Blu-ray Disc in which a video content is stored according to BDMV Standard.

A method for reproducing a video disk in which a plurality of applications to be implemented at the time of reproduction of the video disk are recorded together with a video title including a plurality of chapters, includes storing an identification of a chapter being reproduced when the power is turned OFF, and also includes starting reproduction of the chapter whose identification is stored when the power is turned ON.

In another embodiment, a method for reproducing a video disk in which a plurality of applications to be implemented at the time of reproduction are recorded together with a video title including a plurality of chapters, and further includes storing an identification of a chapter being reproduced when the reproduction of the video disk is stopped, and starting reproduction of the chapter whose identification is stored when the reproduction of the video disk is started.

BRIEF DESCRIPTION OF THE DRAWINGS

FIGS. 2A and 2B are flowcharts showing a process for continued reproduction according to an embodiment of the invention;

FIG. 3 is a drawing showing an example of operation of the continued reproduction according to an embodiment of the invention;

DESCRIPTION OF THE PREFERRED EMBODIMENTS

Hereinafter, a video reproducing apparatus according to various embodiments of the invention will be described with an example of a video reproducing apparatus, which reproduces an HD DVD having a video content recorded therein according to HD DVD-Video Standard.

Figure 1:
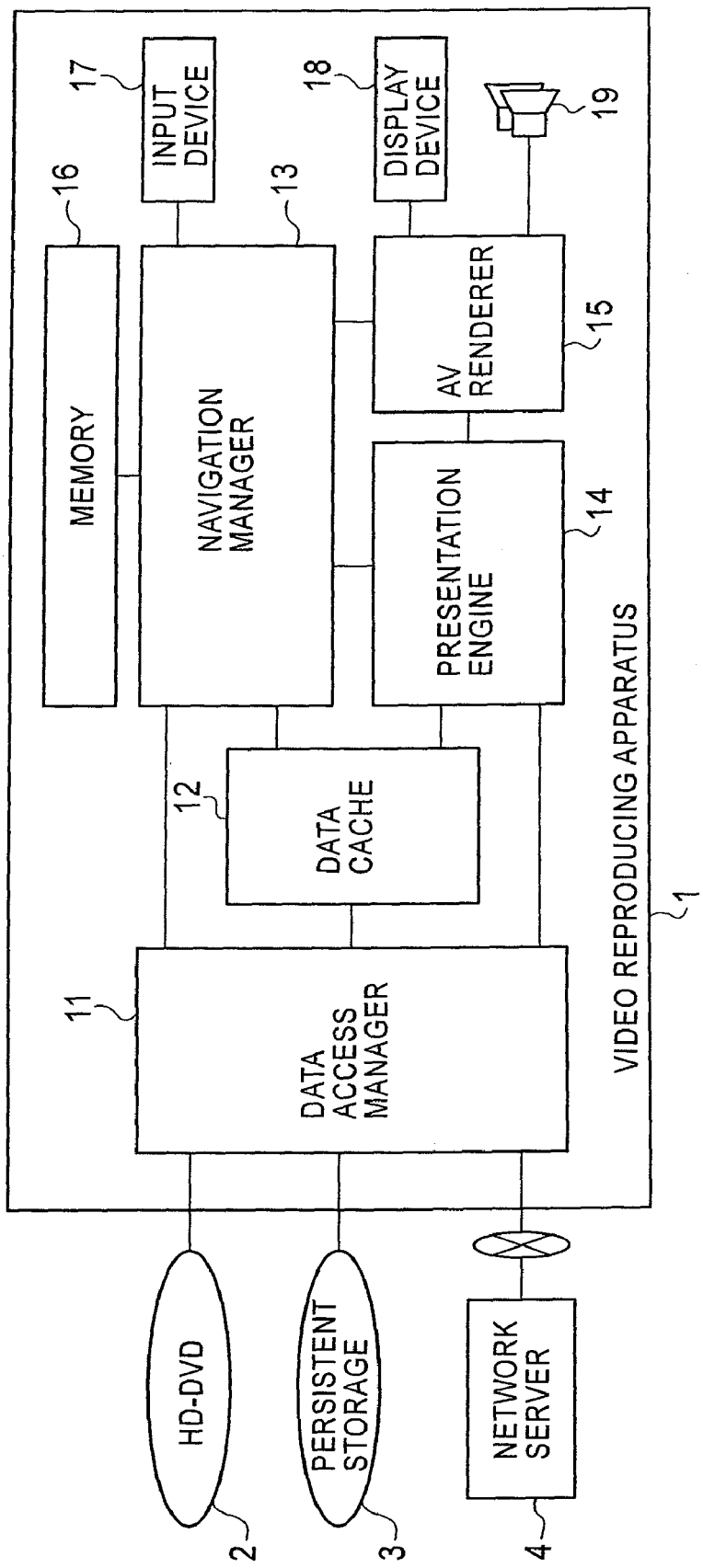
FIG. 1 is a block diagram showing a configuration of a video reproducing apparatus according to an embodiment of the invention.

FIG. 1 shows a configuration of the video reproducing apparatus according to one embodiment. As shown in FIG. 1, a video reproducing apparatus 1 includes a data access manager 11, a data cache 12, a navigation manager 13, a presentation engine 14, an AV renderer 15, a memory 16, an input device 17, a display device 18, and a speaker 19.

The video reproducing apparatus 1 in this configuration may be a computer having a microprocessor, a memory, and other peripheral devices, an may implement a process or program executed by the microprocessor.

In one configuration of the video reproducing apparatus, the navigation manager 13 controls reproduction of a primary video set, a secondary video set, an application, and an advanced subtitle with a unit of title on the basis of a playlist read out from an HD DVD disk 2 via the data access manager 11 or the data cache 12. A plurality of chapters may be defined for each title.

The presentation engine 14 decodes output videos and output audio of the primary video set, the secondary video set, the application, or the advanced subtitle from data obtained from the HD DVD disk 2, a persistent storage 3, or a network server 4 on the network under the control of the navigation manager 13. Then, the AV renderer 15 draws and synthesizes respective output videos decoded by the presentation engine 14, displays the output on the display device 18, synthesizes the output audio decoded by the presentation engine 14, and outputs the same to the speaker 19.

The primary video set and the secondary video set are video objects, and the advanced subtitle is an explanatory title object. The application includes manifests, markups and scripts, and the manifests indicate initialization information of the application.

The markups define output video/audio (voice) of the application built using buttons, images, voices, animations, and fonts. The markups are used to define an interactive user interface, such as chapter menus or other menus. The scripts are programs which control the respective applications and various reproducing operations of the video reproducing apparatus 1. The scripts may include a script that defines predetermined process in response to various user key strokes. A may be activated by selection of a display object, such as a button on the output video of the application, which is displayed by the definition of the markup.

In the video reproducing apparatus 1 in this configuration, the navigation manager 13 may perform a continued reproduction information storing process and a continued reproduction starting process to facilitate continued reproduction. The term "continued reproduction" means that reproduction of the content of the medium is continued or "restarted" after an interruption.

FIG. 2A shows a procedure of the continued reproduction information storing process. In this process, the following information is first acquired: a) an identifier of the HD DVD disk 2 being reproduced, b) an identifier of a title being reproduced (title number, for example), and c) an identifier of the chapter being reproduced (chapter number, for example). The process of storing these identifiers in the memory 16 as a continued reproduction information (Step 202) is repeated at a predetermined interval, for example, at one second intervals (Step 204).

However, this process may be replaced by a process of acquiring the following information: a) the identifier of the HD DVD disk 2 being reproduced, b) the identifier of the title being reproduced, and c) the identifier of the chapter being reproduced upon occurrence of a Power-OFF operation by a user. The process then stores this information in the memory 16 as the continued reproduction information prior to the Power-OFF operation, and the acquires the following information: a) the identifier of the HD DVD disk 2 being reproduced, b) the identifier of the title being reproduced and c) the identifier of the chapter being reproduced upon occurrence of a reproduction-stop operation by the user. The process then stores this information in the memory 16 as the continued reproduction information prior to the Reproduction-OFF operation of the HD DVD disk 2.

The continued reproduction starting process will now be described. The continued reproduction starting process is initiated when the power of the video reproducing apparatus is turned ON with the HD DVD disk 2 mounted in the device. This may occur when a reproduction starting operation is requested by the user where the HD DVD disk 2 is in a reproduction-stopped state (paused state is not included) and the video reproducing apparatus is in a Power-ON state. FIG. 2B shows a flowchart of the continued reproduction starting process. In this process, it is first determined if the continued reproduction information is stored in the memory 16 (Step 252). If not, then reproduction according to a playlist for earliest reproduction stored in the HD DVD disk 2 is started, whereby the normal reproduction of the HD DVD disk 2 is started (Step 254), and the process ends.

When the process determines that the continued reproduction information is stored in the memory 16, the process determines if the identifier of the HD DVD disk 2 being mounted matches the identifier of the HD DVD disk 2 included in the continued reproduction information (Step 256). If not, control branches to Step 254 where the normal reproduction of the HD DVD disk 2 is started, and the process ends.

When the identifier of the HD DVD disk 2 being mounted matches the identifier of the HD DVD disk 2 included in the continued reproduction information, a menu application for continued reproduction and a script for continued reproduction, are specified from among the applications recorded in the HD DVD disk 2 (Step 258).

The menu application for continued reproduction is an application for displaying a menu (referred to as a chapter menu) for accepting a Reproduction-Start command from the user. This facilitates reproducing the chapter indicated by the identifier included in the continued reproduction information, which has the title indicated by the identifier of the title included in the continued reproduction information.

Such an application may be selectively performed by using a chapter reproduction startup command ("chapter_jump 0", for example) provided respectively in each of the plurality of chapters. This includes the chapter indicated by the identifier of the chapter in the continued reproduction information and having the title with the identifier of the title included in the continued reproduction information according to a user operation.

In the HD DVD disk 2, two types of applications are possible. A first type of application displays the chapter menu, which is a playlist-related advanced application. A second type of application is defined as a presentation object, which is effective for the entire duration of the title having unscheduled asynchronous attributes. Therefore, when specifying the menu application for continued reproduction, it is preferable to search the menu application for continued reproduction initially by using the first type of application, followed by the second type of application.

Whether or not it is the playlist-related advanced application that is identified by the description, such as Playlist Application, or presence or absence of the nonscheduled, asynchronous attributes, the effective duration is identified by the description of title TimeBegin/End, sync, autorun of the ApplicationSegment element of each application.

Then, the script for continued reproduction is activated according to the user operation in the menu application in the form of a script including the Reproduction-Rtart command ("chapter_jump 0", for example) corresponding to the chapter indicated by the identifier included in the continued reproduction information.

Figure 4A:
FIGS. 4A and 4B are drawings showing examples of a display screen of the video reproducing apparatus according to an embodiment of the invention.

FIG. 4A shows a screen for inquiring from the user whether to perform the continued reproduction or to whether to perform reproduction from the beginning of the HD DVD disk 2 (Step 260). When the reproduction from the beginning is instructed (Step 262), the procedure branches to Step 254, where the normal reproduction of the HD DVD disk 2 is started, and the process ends.

When the continued reproduction is instructed by the user (Step 282), the specified script for continued reproduction is performed, and the process ends. The above describes the continued reproduction starting process.

An example of operation of the continued reproduction by the video reproducing apparatus 1 as described above is shown in FIG. 3. FIG. 3 shows the reproduction of a title having an identifier #m in the HD DVD disk 2 having an identifier #n, which is defined by the playlist. When the reproduction of the title having the identifier #m is started, the video of the primary video set is reproduced from Chapter 00 in sequence of the number, and simultaneously, an explanatory title is displayed by the advanced subtitle.

When the reproduction of the video of the primary video set is advanced to a midpoint of Chapter 01, implementation of an application 1 is started. When the reproduction of the video of the primary video set is advanced to the midpoint of Chapter 02, implementation of an application 2 is started.

When Power-OFF or Reproduction-Stop of the video reproducing apparatus 1 occurs (302) at a point in time (indicated by 301, e.g., when the title is reproduced to the midpoint of Chapter 03), the continued reproduction information to be stored from this point onward includes the following: a) the identifier #n of the HD DVD disk 2 being reproduced, b) the identifier #m of the title being reproduced, and c) an identifier 03 of the chapter being reproduced which are stored (303).

When turning ON power or when the reproduction starting operation occurs in the state of "Power ON" and "Reproduction-Stop" and where the HD DVD disk 2 (304) has not been replaced, an application for continued reproduction displays a chapter menu having a title of the identifier #m of the title, which is indicated by the continued reproduction information of FIG. 3B (305). A script 320 is activated by operation of the button of Chapter 3, which includes a command for starting the reproduction of the identifier 03 of the chapter included in the continued reproduction information.

The script 320 was prepared by a producer of the video content of the HD DVD, and includes a command to start the reproduction of the primary video set or the advanced subtitle for displaying the explanatory title simultaneously with the primary video set from the beginning of Chapter 03. The script also includes a command for starting applications which the producer of the video content considers to be necessary or desirable to implement at the same time as starting of Chapter 03. The startup command is expected to be the application 1 and the application 2, which are the same as the application which is implemented during the reproduction of Chapter 03 when the title #m is reproduced from the beginning according to the playlist.

When the startup command of the application 1 and the application 2 are included in script 320, reproduction of the primary video set and the advanced subtitle is started from the beginning of Chapter 03, and application 1 and application 2 are started (308) by the implementation of the script 320 (307).

According to this embodiment, although processing may not be able to restart the reproduction accurately from the point of reproduction at the time point when the power has been turned OFF (or when reproduction has been previously stopped when the power is turned), the process is able to accurately reproduce from the chapter break point immediately before the point of reproduction, that is, from the beginning of the chapter being reproduced.

When the continued reproduction is performed, restarting the reproduction process from the beginning of the chapter which has been reproduced, (which is immediately before the point of reproduction being reproduced) is a good point to restart in terms of a configuration of the story of the title. This is also significant with respect to permitting the user to view the title after a smooth restart.

On the other hand, the script implemented by the video reproducing apparatus 1 when either the power is turned ON or when the reproduction is started, is a script defined by the producer of the video title. Accordingly, it is expected that the script starts an application together with the chapter restarted by this script, simultaneously with the start of reproduction of the corresponding chapter. Therefore, according to the video reproducing apparatus 1 as described above, continued reproduction of the video title in association with continued reproduction of the application is expected in a simple configuration which does not require storing the state of the application when the power is turned OFF or when the reproduction is stopped.

The continued reproduction starting process described above may be replaced by a process of starting the normal reproduction of the HD DVD disk 2 when the power of the video reproducing apparatus is turned ON (with the HD DVD disk 2 mounted thereon), and when the reproduction starting operation is conducted by the user with the HD DVD disk 2 in the "reproduction-stopped state" and mounted in the video reproducing apparatus in the Power-ON state. This process subsequently displays a screen to the user inquiring whether or not to perform continued reproduction when the above-described menu application for continued reproduction is implemented.

Alternatively, the continued reproduction starting process described above may be replaced by a process of starting the normal reproduction of the HD DVD disk 2 when the power of the video reproducing apparatus is turned ON (with the HD DVD disk 2 mounted therein), and when the reproduction starting operation is conducted by the user with the HD DVD disk 2 in the "reproduction-stopped state" and mounted on the video reproducing apparatus in the Power-ON state. A predetermined error notification is displayed when the script for continued reproduction is not included in the script activated from the application regarded as the menu application for continued reproduction.

Figure 4B:
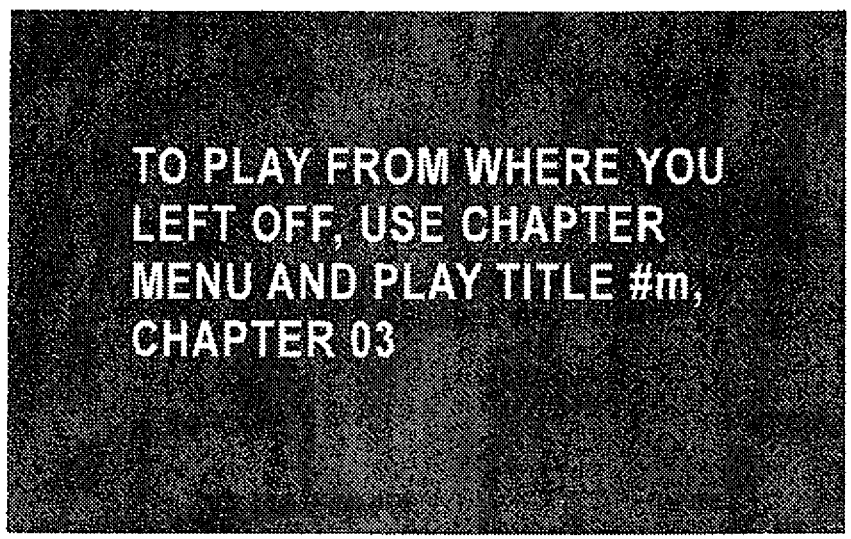

The continued reproduction starting process described above may indicate the identifier of the title of the continued reproduction information, and the identifier of the chapter of the continued reproduction information. This information may be shown on the display screen of FIG. 4B on the display device 18 via the AV renderer 15 when a) the continued reproduction information is stored in the memory 16, and b) when the power of the video reproducing apparatus is turned ON with the HD DVD disk 2 mounted therein, and c) when the reproduction starting operation is conducted by the user with the HD DVD disk 2 in the "reproduction-stopped" state mounted on the video reproducing apparatus in the Power-ON state.

In this configuration, when the power is tuned on or when the reproduction is started, the identification of the title and the chapter being reproduced when the power was turned OFF or when the reproduction was previously stopped, is displayed. Accordingly, the user is able to restart the reproduction from the beginning of the previous chapter, by following the display and using the chapter menu described above.

Although the application of the invention to the video reproducing apparatus 1 for reproducing the HD DVD has been exemplified for description, the embodiment is also applicable in the same manner to the video reproducing apparatus 1 for reproducing the Blu-Ray Discs in which the video content is stored according to BDMV Standard or to the video reproducing apparatus 1 for reproducing DVDs in which the video content is stored according to DVD-Video Standard.

Although only a few exemplary embodiments have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims.

What is claimed is:

1. A video reproducing apparatus for reproducing a video disk in which a plurality of applications to be implemented at the time of reproduction are recorded together with a video title and a plurality of chapters, the apparatus comprising:
 a continued reproduction information storing unit configured to store an identification of a chapter being reproduced, when reproduction of the video disk is temporarily interrupted or when power is turned off, wherein each of the plurality of chapters has a corresponding application configured to control predefined operations to be carried out in response to input from the user; and
 a continued reproduction starting unit having a plurality of applications stored therein, and configured to issue an inquiry to a user to determine if continued reproduction of the chapter whose identification is stored in the continued reproduction information storing unit is wanted by the user after the power is turned ON or after reproduction of the video disk is started, and if the continued reproduction of the chapter whose identification is stored in the continued reproduction information storing unit is wanted by the user, the continued reproduction starting unit carries out a continued reproduction process based on a corresponding application so as to start reproduction of the chapter whose identification is stored in the continued reproduction information storing unit.

2. The video reproducing apparatus according to claim 1, wherein the continued reproduction starting unit executes an application stored in the video disk for displaying a chapter menu including starting reproduction of the chapter which is selected and accepted on the chapter menu when the application accepts the selection of the chapter.

3. The video reproducing apparatus according to claim 1, wherein the video disk is an HD DVD in which a video content is stored according to HD DVD-Video Standard.

4. The video reproducing apparatus according to claim 1, wherein the video disk is a Blu-ray Disc in which a video content is stored according to BDMV Standard.

5. A video reproducing apparatus for reproducing a video disk in which a video title including a plurality of chapters is recorded, comprising:
 a continued reproduction information storing unit configured to store an identification of a chapter being reproduced when power is turned OFF or when reproduction of the video disk is temporarily interrupted, wherein each of the plurality of chapters has a corresponding application configured to control predefined operations to be carried out in response to input from the user; and
 a continued reproduction information display unit configured to display identification of the chapters stored in the continued reproduction information storing unit when the power is turned ON or when reproduction of the video disk is started, and configured to issue an inquiry to a user to determine if continued reproduction of the chapter whose identification is stored in the continued reproduction information storing unit is wanted by the user after the power is turned ON or after reproduction of the video disk is started, and if the continued reproduction of the chapter whose identification is stored in the continued reproduction information storing unit is wanted by the user, the continued reproduction starting unit carries out a continued reproduction process based on a corresponding application so as to start reproduction of the chapter whose identification is stored in the continued reproduction information storing unit.

6. A non-transient computer readable memory or data storage means encoded with data representing a computer program for reproducing a video disk in which a plurality of applications to be implemented at the time of reproduction of the video disk are recorded together with a video title including a plurality of chapters, comprising:
 storing, in a continued reproduction information storing unit, an identification of a chapter being reproduced when the power is turned OFF or when reproduction of the video disk is temporarily interrupted, wherein each of the plurality of chapters has a corresponding application configured to control predefined operations to be carried out in response to input from the user; and
 issuing an inquiry to a user to determine if continued reproduction of the chapter whose identification is stored in the continued reproduction information storing unit is wanted by the user after the power is turned ON or after playback reproduction of the video disk is started, and if the continued reproduction of the chapter whose identification is stored in the continued reproduction information storing unit is wanted by the user, carrying out a continued reproduction process based on a corresponding application so as to start reproduction of the chapter whose identification is stored in the continued reproduction information storing unit.

7. The non-transient computer readable memory or data storage means according to claim 6, further including issuing an inquiry to determine whether or not the continued reproduction of the chapter whose identification is stored in the continued reproduction information storing unit is wanted when the power is turned ON or when playback of the video disk is started and, only when the continued reproduction of the chapter whose identification is stored in the continued reproduction information storing unit is wanted, starting reproduction of the chapter whose identification is stored in the continued reproduction information storing unit.

8. The non-transient computer readable memory or data storage means according to claim 6, further including starting reproduction of the chapter which is selected and accepted on the chapter menu when the application accepts the selection of the chapter whose identification is stored in the continued reproduction information storing unit on the chapter menu.

9. The non-transient computer program according to claim 6, wherein the video disk is an HD DVD in which a video content is stored according to HD DVD-Video Standard.

10. The non-transient computer program according to claim 6, wherein the video disk is a Blu-ray Disc in which a video content is stored according to BDMV Standard.

11. A non-transient computer readable memory or data storage means encoded with data representing a computer program for reproduction a video title continuously from a point of reproduction in a video title, comprising:
  storing, in an continued reproduction information storing unit, an identification of a chapter being reproduced when the power is turned OFF or when reproduction of the video disk is temporarily interrupted, wherein each of the plurality of chapters has a corresponding application configured to control predefined operations to be carried out in response to input from the user; and
  displaying the identification of the chapter whose identification is stored in the continued reproduction information storing unit when the power is tuned ON or when reproduction of the video disk is started;
  issuing an inquiry to a user to determine if continued reproduction of the chapter whose identification is stored in the continued reproduction information storing unit is wanted by the user after the power is turned ON or after reproduction of the video disk is started, and if the continued reproduction of the chapter whose identification is stored in the continued reproduction information storing unit is wanted by the user, carrying out a continued reproduction process based a corresponding application so as to start reproduction of the chapter whose identification is stored in the continued reproduction information storing unit.

12. A method for playing back a video disk in which a plurality of applications to be implemented at the time of reproduction of the video disk are recorded together with a video title including a plurality of chapters, comprising steps of:
  storing, in a continued reproduction information storing unit, an identification of a chapter being reproduced when the power is turned OFF or when reproduction of the video disk is temporarily interrupted, wherein each of the plurality of chapters has a corresponding application configured to control predefined operations to be carried out in response to input from the user; and
  starting reproduction of the chapter whose identification is stored in the continued reproduction information storing unit when the power is turned ON or when reproduction of the video disk is started;
  issuing an inquiry to a user to determine if continued reproduction of the chapter whose identification is stored in the continued reproduction information storing unit is wanted by the user after the power is turned ON or after reproduction of the video disk is started, and if the continued reproduction of the chapter whose identification is stored in the continued reproduction information storing unit is wanted by the user, carrying out a continued reproduction process based a corresponding application so as to start reproduction of the chapter whose identification is stored in the continued reproduction information storing unit.

13. A method for reproducing a video title continuously from a point of reproduction in a video title, comprising steps of:
  storing, in a continued reproduction information storing unit, an identification of the chapter being reproduced when the power is turned OFF or when reproduction of the video disk is temporarily interrupted, wherein each of the plurality of chapters has a corresponding application configured to control predefined operations to be carried out in response to input from the user; and
  displaying the identification of the chapter stored in the continued reproduction information storing unit when the power is tuned ON or when reproduction of the video disk is started;
  issuing an inquiry to a user to determine if continued reproduction of the chapter whose identification is stored in the continued reproduction information storing unit is wanted by the user after the power is turned ON or after reproduction of the video disk is started, and if the continued reproduction of the chapter whose identification is stored in the continued reproduction information storing unit is wanted by the user, carrying out a continued reproduction process based a corresponding application so as to start reproduction of the chapter whose identification is stored in the continued reproduction information storing unit.

* * * * *

UNITED STATES PATENT AND TRADEMARK OFFICE
CERTIFICATE OF CORRECTION

| | |
|---|---|
| PATENT NO. | : 8,295,676 B2 |
| APPLICATION NO. | : 12/257058 |
| DATED | : October 23, 2012 |
| INVENTOR(S) | : Masaru Kimura et al. |

It is certified that error appears in the above-identified patent and that said Letters Patent is hereby corrected as shown below:

In the Claims

In column 8, claim 6, line 57, before "reproduction of the video disk" delete "playback".

Signed and Sealed this
Ninth Day of July, 2013

Teresa Stanek Rea
*Acting Director of the United States Patent and Trademark Office*